United States Patent [19]

Leppanen et al.

[11] Patent Number: 5,426,670
[45] Date of Patent: Jun. 20, 1995

[54] INTERFERENCE COMPENSATING CIRCUIT INCLUDING A MATCHED FILTER FOLLOWED BY A MEDIAN FILTER

[75] Inventors: Pentti Leppanen; Jari Iinatti, both of Oulu, Finland

[73] Assignee: Nokia Mobile Phones Ltd., Finland

[21] Appl. No.: 92,239

[22] Filed: Jul. 15, 1993

[30] Foreign Application Priority Data

Jul. 27, 1992 [FI] Finland .................. 923388

[51] Int. Cl.⁶ .......................... H04L 27/06
[52] U.S. Cl. ...................... 375/343; 375/1; 375/10; 375/103; 364/724.11; 455/307; 325/207; 325/227; 325/350
[58] Field of Search .......... 375/96, 99, 101, 103, 375/1, 115, 10; 364/724.01, 724.11; 455/63, 296, 307; 307/543

[56] References Cited

U.S. PATENT DOCUMENTS

| | | | |
|---|---|---|---|
| 4,682,230 | 7/1987 | Perlman et al. | 358/167 |
| 4,882,737 | 11/1989 | Dzung | 375/96 |
| 4,906,928 | 3/1990 | Gard | 324/240 |
| 4,910,467 | 3/1990 | Leitch | 329/306 |
| 4,928,258 | 5/1990 | May | 364/724.17 |
| 5,142,551 | 8/1992 | Borth et al. | 375/103 |
| 5,235,424 | 8/1993 | Wagner et al. | 358/174 |
| 5,271,042 | 12/1993 | Borth et al. | 364/724.11 |
| 5,285,480 | 2/1994 | Chennakoshu et al. | 375/96 |

FOREIGN PATENT DOCUMENTS

| | | |
|---|---|---|
| 0386985A2 | 9/1990 | European Pat. Off. |
| 923388 | 9/1993 | Finland |
| 3922972 | 1/1990 | Germany |
| 2243733 | 11/1991 | United Kingdom |

OTHER PUBLICATIONS

Patent Abstracts of Japan, vol. 11, No. 245 (E-531) 11 Aug. 1987 & JP-A-62 059 420 (Toshiba Corp.) 16 Mar. 1987.

IEEE Transactions on Communication Technology "Performance of Digital Matched Filter Correlator With Unknown Interference" by C. R. Cahn, vol. COM-19, No. 6, Dec. 1971, New York, pp. 1163-1172.

Primary Examiner—Stephen Chin
Assistant Examiner—Amanda T. Le
Attorney, Agent, or Firm—Perman & Green

[57] ABSTRACT

A circuit arrangement is disclosed for reducing the adverse effects of interference in a signal of interest. The circuit arrangement includes a matched filter for receiving the signal of interest and a median filter coupled to the output of the matched filter. The median filtered output signal of the matched filter is utilized to remove interference, to calculate the threshold level, or to estimate the interference level at the output of the matched filter.

12 Claims, 2 Drawing Sheets

INTERFERENCE COMPENSATING CIRCUIT INCLUDING A MATCHED FILTER FOLLOWED BY A MEDIAN FILTER

The present invention relates to a circuit arrangement for reducing the adverse effects of an interference signal on a data signal.

BACKGROUND OF THE INVENTION

The term data signal is intended to mean any signal carrying data or information, including telecommunications data.

A matched filter is used to detect a signal e.g. in telecommunications. The impulse response of a realizable matched filter is a signal, which is scaled, delayed and inverted in time. At the output of the filter matched to the signal we obtain the maximum level when the signal is completely received.

The output waveform of the filter is proportional to the autocorrelation function of the signal itself. In an Additive Gaussian White Noise (AGWN) channel the matched filter maximizes the momentary signal to noise ratio and minimizes the error probability of the transmission system. If also interference is added to the signal in the transmission channel the receiver will not anymore operate in an optimal way, and the performance will be reduced.

A matched filter is also used in spread spectrum telecommunication systems. Then it can be used for the detection of a data signal and also i.e. in the search phase for the code synchronization of the receiver, so that the filter impulse response is a time inverted, scaled and delayed version of the distribution code or part of it.

The prior art is described below with reference to FIGS. 1 to 3 of the accompanying drawings, in which:

FIG. 1 shows a code synchronization system, selected as an example, in accordance with the prior art;

FIG. 2 shows the output signal of the prior art matched filter in FIG. 1; and

FIG. 3 shows the signal provided by the threshold comparison block.

FIG. 1 shows a prior art code synchronization system. The code synchronization system comprises a filter 1 matched to the spreading code, a threshold comparison means 2, and means 3 for activation of the monitoring.

The maximum value is obtained at the filter 1 output when the spreading code or a part of it is received, and it can synchronize the code generator or the receiver after the threshold comparison.

FIG. 2 shows the output signal of a prior art matched filter in an exemplary case. The exemplary case is ideal and the code contains L chips and the chip period is T seconds. The output signal 4 is now an ideal autocorrelation function containing impulses having a height of L times the level of the received signal, the repeating period being the code length L×T seconds.

FIG. 3 shows the signal provided by the threshold comparison block. The signal 5 of the threshold comparison block 2 has the value "1" when the output signal 4 of the matched filter exceeds the threshold level.

For example a deterministic error could be disastrous, because remnants of the interference could be evident at the output of the filter 1. Then the synchronization ability decreases, preferably if the code's autocorrelation function form is not ideal and contains side lobes, which in combination with the interference response could cause the threshold level to be exceeded. The matched filter 1 certainly attenuates the interference, but for instance the attenuation of a continuous interference at the center frequency of the filter decreases when the imbalance of the spreading code increases, or in a binary case, when the difference between the number of ones and zeroes increases.

Usually we try to remove the interference by different attenuation or correction algorithms. These methods are often complicated and require computing time in order to estimate the characteristics of the interference or the state of the channel.

SUMMARY OF THE INVENTION

According to the present invention there is provided a circuit arrangement for reducing the adverse effects of an interference signal on a data signal, the circuit arrangement comprising a matched filter characterized in that the output of the matched filter is coupled to a median filter to compensate for rapid changes in the data signal, and the output of the median filter is coupled to a calculation circuit in which a signal characteristic of the interference signal at the output of the matched filter is determined such that the data signal may be compensated for the effect of the interference signal.

An advantage of the present invention is the provision of a circuit arrangement which will address the above presented disadvantages and problems.

BRIEF DESCRIPTION OF THE DRAWINGS

Embodiments of the present invention are described, by way of example, with reference to FIGS. 4 to 7 of the accompanying drawings, in which.

DETAILED DESCRIPTION OF THE INVENTION

Figure 1:
Figure 2:
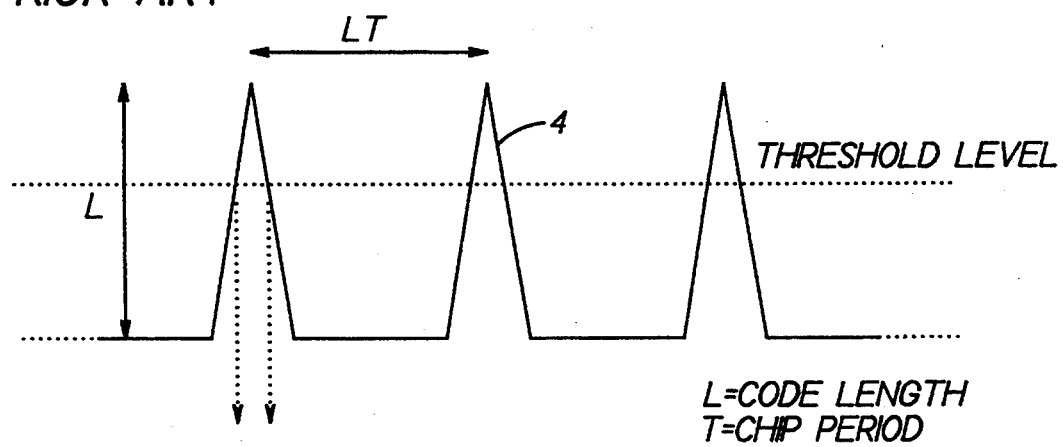
Figure 3:
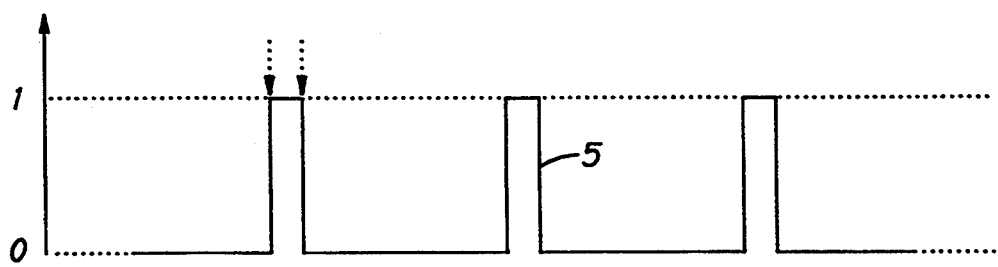
Figure 4:
FIG. 4 shows the median filtered output signal of the matched filter in principle.

It is well known that rapid changes or impulses can be removed from a signal with a median filter, which is illustrated in FIG. 4 where the output signal of a matched filter is fictitiously median filtered. In median filtering the signal or samples taken of it are processed so that a median (MED) is calculated for each $2k+1$ samples, in which k is an integer. Then the output signal 6 of the median filter is $$y(n) = \text{MED}[x(n-k), x(n-k+1), \ldots, x(n), \ldots, x(n+k)].$$

$x(n)$ is an input signal, in which the integer n represents the sampling moment as multiples of the sampling interval.

The solution in accordance with the invention presents a different circuit arrangement to estimate and to remove the interference with the aid of a median filter. An advantage of the circuit arrangement in accordance with the invention is based on the impulse nature of the output signal of the matched filter.

Figure 5:
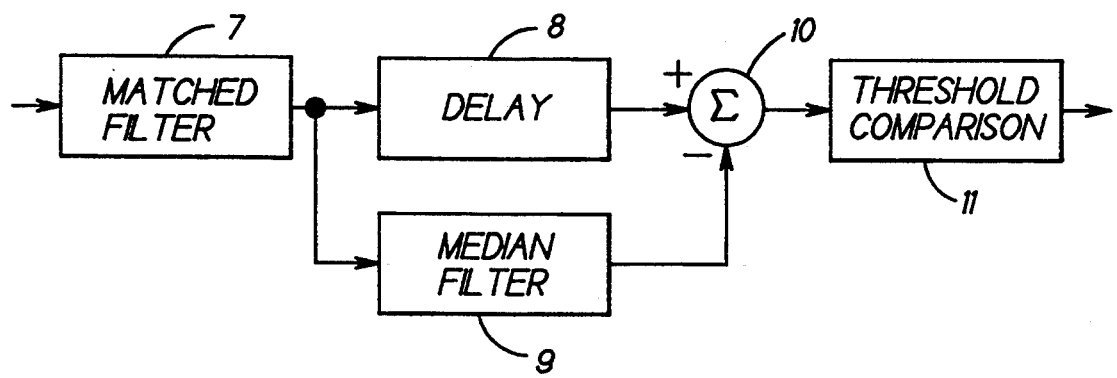
FIG. 5 shows the block diagram of a circuit arrangement, in accordance with the invention.

FIG. 5 shows a block diagram of an embodiment of the circuit arrangement in accordance with the invention. The circuit arrangement comprises a filter 7 matched to the signal, a delay element 8, a median filter 9 and an adder 10, followed by a threshold comparison 11. In a traditional case samples are taken at the output of the matched filter 7, and they are compared to a threshold level in the threshold comparator 11, after which the presence of a signal is determined. Particularly, when there occurs a deterministic error it is possible that the base level of the samples between the impulse peaks exceeds the threshold, whereby erroneous decisions could be made continuously.

In the circuit arrangement the signal or the samples obtained from the matched filter 7 are median filtered in the median filter 9 so that the median of $2k+1$ samples is calculated $$y(n)=\text{MED}[x(n-k), x(n-k+1), \ldots, x(n), \ldots, x(n+k)].$$

At the same time samples obtained at the output of the matched filter 7 are delayed by k samples in the delay means 8, after which the difference between the delayed signal and the sample sequence provided by the median filter 9 is calculated in the adding means 10. Only then the difference signal is compared with the threshold level in the comparison means 11.

Here the circuit arrangement has an advantage that the offset from the base level, caused by the interference, can be removed from the signal and at the same time we obtain information about the interference. The median filter 9 is basically of a low-pass type. The calculation of the difference signal corresponds to a high-pass type processing in order to remove the interference, the processing being based on the impulse-like nature of the actual useful signal.

Figure 6:
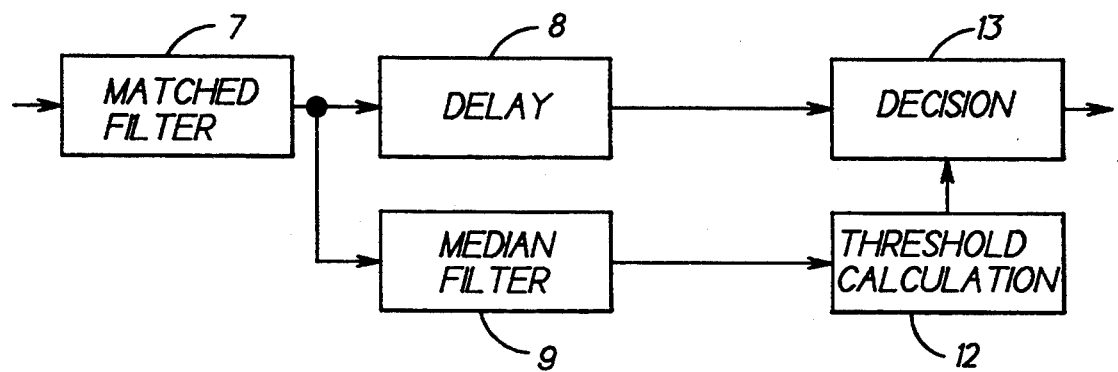
FIG. 6 shows a block diagram of an alternative circuit arrangement, in accordance with the invention.

FIG. 6 shows the block diagram of an alternative solution of the circuit arrangement in accordance with the invention. In the alternative circuit arrangement the signal or the samples obtained from the filter 7 are median filtered in the median filter 9 so that the median of $2k+1$ samples is calculated. The threshold calculation block 12 uses the output of the median filter 9 in determining a threshold for a decision circuit 13. At the same time the samples obtained at the output of the matched filter 7 are delayed by k samples in the delay means 8, after which the delayed signal is supplied to the decision circuit 13. In the decision circle 13 the output signal is determined on the basis of the basic data.

Figure 7:
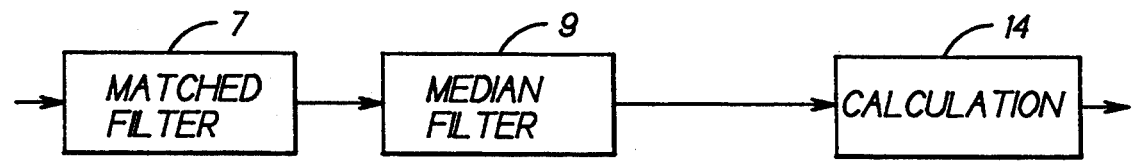
FIG. 7 shows the block diagram of another alternative circuit arrangement, in accordance with the invention.

FIG. 7 shows the block diagram of another alternative solution of the circuit arrangement in accordance with the invention. In the second alternative solution the signal or samples obtained from the matched filter 7 are median filtered in the median filter 9 so that the median of $2k+1$ samples is calculated. The obtained signal is supplied to the calculation circuit 14, which calculates the output signal based solely on the output of the median filter 9, and without considering also the signal that is output from the matched filter 7. The output of the median filter 9 is then employed as desired by the calculation circuit 14.

In view of the foregoing it will be clear to a person skilled in the art that modifications may be incorporated without departing from the scope of the present invention.

What we claim is:

1. A received signal filtering circuit arrangement, the circuit arrangement having an input for receiving a data signal in conjunction with an interference signal and comprising a matched filter, said circuit arrangement being characterized in that the output of the matched filter is coupled to an input of a median filter to compensate for rapid impulses in the data signal, and an output of the median filter is coupled to further circuit means in which a signal characteristic of an interference signal at the output of the matched filter is determined.

2. A circuit arrangement as claimed in claim 1, wherein the output of the matched filter is coupled to the further circuit means through a delay means.

3. A circuit arrangement as claimed in claim 2, wherein the delay means delays the output signal from the matched filter by "k" samples prior to being supplied to the the further circuit means, where k is an integer.

4. A circuit arrangement as claimed in claim 2, wherein a difference between an output of the delay means, and the output of the median filter, is calculated to provide an output signal having a magnitude that is a function of a magnitude of the interference signal.

5. A circuit arrangement as claimed in claim 2, wherein the circuit arrangement comprises an adder means interposed between said further circuit means and both of said matched filter/delay means and said median filter, said adder means having a first input coupled to an output of said delay means, a second input coupled to said output of said median filter, and an output coupled to an input of said further circuit means, said output of said adder means expressing a difference between the delayed signal at said first input and the median filtered signal at said second input.

6. A circuit arrangement as claimed in claim 2, wherein the signal or samples obtained from the matched filter are filtered in the median filter so that a median of $2k+1$ samples is calculated, where k is an integer, and that at substantially the same time the samples obtained at the output of the matched filter are delayed by k samples in the delay means.

7. A circuit arrangement as claimed in claim 2, wherein the delayed signal is supplied to a decision circuit, the output of the median filter is supplied to a calculation circuit, which calculates a threshold value and then supplies the calculated threshold value to the decision circuit which determines an output signal based on the delayed signal and the calculated threshold value.

8. A circuit arrangement as claimed in claim 1, wherein the signal or the samples obtained from the matched filter are filtered in the median filter so that a median of $2k+1$ samples is calculated, where k is an integer, and wherein the output of the median filter is input to a calculation circuit, which calculates an output signal.

9. A circuit for receiving a signal that includes a spreading code, comprising:

matched filter means having an input for receiving the signal and an output, said matched filter means having a filter characteristic that is matched to the spreading code;

delay means having an input coupled to said output of said matched filter means for delaying a signal output from said matched filter means by k samples, where k is an integer, said delay means having an output;

median filter means having an input coupled to said output of said matched filter means and an output, said median filter means processing said output of said matched filter means and determining a median thereof for each of 2k+1 samples of said output of said matched filter means; and further circuit means coupled to said output of said delay means and to said output of said median filter means for processing said output of said delay means in accordance with said output of said median filter means.

10. A circuit as set forth in claim 9 wherein said further circuit means is comprised of:

first circuit means, having a first input coupled to said output of said delay means and a second input coupled to said output of said median filter means, for subtracting said output of said median filter means from said output of said delay means, said first means having an output; and second circuit means, having an input coupled to said output of said first circuit means, for comparing a signal output from said first means to a reference signal, said signal output from said first means being substantially free of interference that may be present in said received signal.

11. A circuit as set forth in claim 9 wherein said further circuit means is comprised of:

first circuit means, having a first input coupled to said output of said output of said median filter means, for calculating a magnitude of a threshold signal from said output of said median filter means, said first means having an output; and second circuit means, having a first input coupled to said output of said delay means and a second input coupled to said output of said first circuit means, for comparing a signal output from said first delay means to said threshold signal.

12. A circuit for receiving a signal that includes a spreading code, comprising:

matched filter means having an input for receiving the signal and an output, said matched filter means having a filter characteristic that is matched to the spreading code;

median filter means having an input coupled to said output of said matched filter means and an output, said median filter means processing said output of said matched filter means and determining a median thereof for each of 2k+1 samples of said output of said matched filter means, where k is an integer; and further circuit means coupled to said output of said median filter means for processing said output of said median filter means to estimate an interference level present in said received signal.

* * * * *